(12) United States Patent
Sun

(10) Patent No.: US 8,414,988 B2
(45) Date of Patent: Apr. 9, 2013

(54) INJECTION STRETCH BLOW MOLDED ARTICLES AND POLYMERS FOR USE THEREIN

(75) Inventor: Luyi Sun, Houston, TX (US)

(73) Assignee: Fina Technology, Inc., Houston, TX (US)

( * ) Notice: Subject to any disclaimer, the term of this patent is extended or adjusted under 35 U.S.C. 154(b) by 583 days.

(21) Appl. No.: 12/142,141

(22) Filed: Jun. 19, 2008

(65) Prior Publication Data

US 2009/0315226 A1    Dec. 24, 2009

(51) Int. Cl.
*B29D 22/00* (2006.01)
*B29D 23/00* (2006.01)
*B32B 1/08* (2006.01)

(52) U.S. Cl.
USPC ...... 428/35.7; 428/36.9; 428/36.92; 428/220; 428/500; 264/532

(58) Field of Classification Search .................. 428/35.7, 428/36.9, 36.92, 220, 500; 264/532
See application file for complete search history.

(56) References Cited

U.S. PATENT DOCUMENTS

| | | | |
|---|---|---|---|
| 5,176,872 A | | 1/1993 | Lucas |
| 6,077,907 A | * | 6/2000 | Raetzsch et al. ............ 525/191 |
| 2005/0249904 A1 | * | 11/2005 | Batlaw et al. ............ 428/35.7 |
| 2006/0173132 A1 | | 8/2006 | Mehta |
| 2007/0254122 A1 | | 11/2007 | Inoue |
| 2008/0038500 A1 | * | 2/2008 | Page et al. ............ 428/36.92 |
| 2008/0114142 A1 | | 5/2008 | Hicks et al. |

FOREIGN PATENT DOCUMENTS

| WO | WO 2007071622 | 6/2007 |
|---|---|---|
| WO | WO 2007147878 | 12/2007 |

\* cited by examiner

*Primary Examiner* — Michael C Miggins

(57) ABSTRACT

Injection stretch blow molded (ISBM) articles and methods of forming the same are described herein. The ISBM articles generally include a propylene-based impact copolymer.

21 Claims, 1 Drawing Sheet

INJECTION STRETCH BLOW MOLDED ARTICLES AND POLYMERS FOR USE THEREIN

FIELD

Embodiments of the present invention generally relate to polymers adapted for use in injection stretch blow molding. In particular, embodiments of the invention relate to propylene-based impact copolymers adapted for use in injection stretch blow molding.

BACKGROUND

Attempts have been made to utilize propylene based random copolymers or homopolymers for injection stretch blow molding (ISBM) applications. However, ISBM articles formed from random copolymers and homopolymers can exhibit poor drop impact strength, particularly at cold temperatures. As ISBM articles are good candidates to contain refrigerated food and beverages, cold temperature drop impact strength is a desirable characteristic.

Therefore, a need exists for ISBM production processes resulting in ISBM articles having improved drop impact strength.

SUMMARY

Embodiments of the present invention include injection stretch blow molded (ISBM) articles. The ISBM articles generally include a propylene-based impact copolymer.

Embodiments of the invention further include semi-opaque injection stretch blow molded (ISBM) beverage containers including a propylene-based impact copolymer exhibiting a melt flow rate of from about 1 dg/min to about 150 dg/min., a maximum top load of at least about 160 N at a weight of 23 g and a cold temperature drop impact resistance of at least about 6 feet.

Embodiments further include methods of forming injection stretch blow molded (ISBM) articles which include providing a propylene-based impact copolymer, injection molding the propylene-based impact copolymer into a preform and stretch-blowing the preform into an article.

DETAILED DESCRIPTION

Introduction and Definitions

Figure 1:
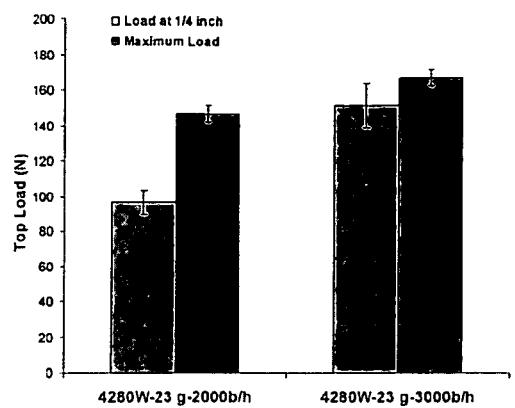
FIG. 1 illustrates the top load strength of ISBM bottles formed from an impact copolymer.

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions when the information in this patent is combined with available information and technology.

Various terms as used herein are shown below. To the extent a term used in a claim is not defined below, it should be given the broadest definition persons in the pertinent art have given that term as reflected in printed publications and issued patents at the time of filing. Further, unless otherwise specified, all compounds described herein may be substituted or unsubstituted and the listing of compounds includes derivatives thereof.

Various ranges are further recited below. It should be recognized that unless stated otherwise, it is intended that the endpoints are to be interchangeable. Further, any point within that range is contemplated as being disclosed herein.

As used herein, "cold temperature" refers to a range of temperatures typical of standard refrigeration methods and means that a temperature difference of a few degrees does not matter to the phenomenon under investigation, such as drop impact testing. In some environments, cold temperature may include a temperature of from about 0° C. to about 10° C. (32° F. to 50° F.), while in other environments, cold temperature may include a temperature of from about 2° C. to about 8° C. (35.6° F. to 46.4° F.), for example. For purposes of cold temperature drop impact testing, as discussed herein, it is customary in the industry to test at a temperature of about 4° C. (39.2° F.). However, cold temperature measurements generally do not include close monitoring of the temperature of the process and therefore such a recitation does not intend to bind the embodiments described herein to any predetermined temperature range.

As used herein, "opaque" means an article is impenetrable to visible light, that is, an opaque object prevents transmission of essentially all visible light. "Transparent" means essentially all visible light passes through the article. The term "semi-opaque" means some, but not all, visible light passes through the article.

Embodiments of the invention generally include heterophasic polymers and processes of forming articles from heterophasic polymers via injection stretch blow molding. As used herein, the term "heterophasic" generally refers to a polymer having two or more phases. The incorporation of a rubber phase into the polymer matrix generally improves impact properties. As a result, the heterophasic polymers may also be referred to as impact copolymers (ICP) herein.

Catalyst Systems

Catalyst systems useful for polymerizing olefin monomers include any catalyst system known to one skilled in the art. For example, the catalyst system may include metallocene catalyst systems, single site catalyst systems, Ziegler-Natta catalyst systems or combinations thereof, for example. As is known in the art, the catalysts may be activated for subsequent polymerization and may or may not be associated with a support material. A brief discussion of such catalyst systems is included below, but is in no way intended to limit the scope of the invention to such catalysts.

For example, Ziegler-Natta catalyst systems are generally formed from the combination of a metal component (e.g., a catalyst) with one or more additional components, such as a catalyst support, a cocatalyst and/or one or more electron donors, for example.

Metallocene catalysts may be characterized generally as coordination compounds incorporating one or more cyclopentadienyl (Cp) groups (which may be substituted or unsubstituted, each substitution being the same or different) coordinated with a transition metal through π bonding. The substituent groups on Cp may be linear, branched or cyclic hydrocarbyl radicals, for example. The cyclic hydrocarbyl radicals may further form other contiguous ring structures, including indenyl, azulenyl and fluorenyl groups, for example. These contiguous ring structures may also be substituted or unsubstituted by hydrocarbyl radicals, such as $C_1$ to $C_{20}$ hydrocarbyl radicals, for example.

Polymerization Processes

As indicated elsewhere herein, catalyst systems are used to form polyolefin compositions. Once the catalyst system is prepared, as described above and/or as known to one skilled in the art, a variety of processes may be carried out using that composition. The equipment, process conditions, reactants, additives and other materials used in polymerization processes will vary in a given process, depending on the desired composition and properties of the polymer being formed. Such processes may include solution phase, gas phase, slurry phase, bulk phase, high pressure processes or combinations thereof, for example. (See, U.S. Pat. No. 5,525,678; U.S. Pat. No. 6,420,580; U.S. Pat. No. 6,380,328; U.S. Pat. No. 6,359,072; U.S. Pat. No. 6,346,586; U.S. Pat. No. 6,340,730; U.S. Pat. No. 6,339,134; U.S. Pat. No. 6,300,436; U.S. Pat. No. 6,274,684; U.S. Pat. No. 6,271,323; U.S. Pat. No. 6,248,845; U.S. Pat. No. 6,245,868; U.S. Pat. No. 6,245,705; U.S. Pat. No. 6,242,545; U.S. Pat. No. 6,211,105; U.S. Pat. No. 6,207,606; U.S. Pat. No. 6,180,735 and U.S. Pat. No. 6,147,173, which are incorporated by reference herein.)

In certain embodiments, the processes described above generally include polymerizing one or more olefin monomers to form polymers. The olefin monomers may include $C_2$ to $C_{30}$ olefin monomers, or $C_2$ to $C_{12}$ olefin monomers (e.g., ethylene, propylene, butene, pentene, methylpentene, hexene, octene and decene), for example. The monomers may include olefinic unsaturated monomers, $C_4$ to $C_{18}$ diolefins, conjugated or nonconjugated dienes, polyenes, vinyl monomers and cyclic olefins, for example. Non-limiting examples of other monomers may include norbornene, nobornadiene, isobutylene, isoprene, vinylbenzocyclobutane, sytrene, alkyl substituted styrene, ethylidene norbornene, dicyclopentadiene and cyclopentene, for example. The formed polymer may include homopolymers, copolymers or terpolymers, for example.

Examples of solution processes are described in U.S. Pat. No. 4,271,060, U.S. Pat. No. 5,001,205, U.S. Pat. No. 5,236,998 and U.S. Pat. No. 5,589,555, which are incorporated by reference herein.

One example of a gas phase polymerization process includes a continuous cycle system, wherein a cycling gas stream (otherwise known as a recycle stream or fluidizing medium) is heated in a reactor by heat of polymerization. The heat is removed from the cycling gas stream in another part of the cycle by a cooling system external to the reactor. The cycling gas stream containing one or more monomers may be continuously cycled through a fluidized bed in the presence of a catalyst under reactive conditions. The cycling gas stream is generally withdrawn from the fluidized bed and recycled back into the reactor. Simultaneously, polymer product may be withdrawn from the reactor and fresh monomer may be added to replace the polymerized monomer. The reactor pressure in a gas phase process may vary from about 100 psig to about 500 psig, or from about 200 psig to about 400 psig or from about 250 psig to about 350 psig, for example. The reactor temperature in a gas phase process may vary from about 30° C. to about 120° C., or from about 60° C. to about 115° C., or from about 70° C. to about 110° C. or from about 70° C. to about 95° C., for example. (See, for example, U.S. Pat. No. 4,543,399; U.S. Pat. No. 4,588,790; U.S. Pat. No. 5,028,670; U.S. Pat. No. 5,317,036; U.S. Pat. No. 5,352,749; U.S. Pat. No. 5,405,922; U.S. Pat. No. 5,436,304; U.S. Pat. No. 5,456,471; U.S. Pat. No. 5,462,999; U.S. Pat. No. 5,616,661; U.S. Pat. No. 5,627,242; U.S. Pat. No. 5,665,818; U.S. Pat. No. 5,677,375 and U.S. Pat. No. 5,668,228, which are incorporated by reference herein.)

Slurry phase processes generally include forming a suspension of solid, particulate polymer in a liquid polymerization medium, to which monomers and optionally hydrogen, along with catalyst, are added. The suspension (which may include diluents) may be intermittently or continuously removed from the reactor where the volatile components can be separated from the polymer and recycled, optionally after a distillation, to the reactor. The liquefied diluent employed in the polymerization medium may include a $C_3$ to $C_7$ alkane (e.g., hexane or isobutane), for example. The medium employed is generally liquid under the conditions of polymerization and relatively inert. A bulk phase process is similar to that of a slurry process with the exception that the liquid medium is also the reactant (e.g., monomer) in a bulk phase process. However, a process may be a bulk process, a slurry process or a bulk slurry process, for example.

In a specific embodiment, a slurry process or a bulk process may be carried out continuously in one or more loop reactors. The catalyst, as slurry or as a dry free flowing powder, may be injected regularly to the reactor loop, which can itself be filled with circulating slurry of growing polymer particles in a diluent, for example. Optionally, hydrogen may be added to the process, such as for molecular weight control of the resultant polymer. The loop reactor may be maintained at a pressure of from about 27 bar to about 50 bar or from about 35 bar to about 45 bar and a temperature of from about 38° C. to about 121° C., for example. Reaction heat may be removed through the loop wall via any method known to one skilled in the art, such as via a double jacketed pipe or heat exchanger, for example.

Alternatively, other types of polymerization processes may be used, such as stirred reactors in series, parallel or combinations thereof, for example. Upon removal from the reactor, the polymer may be passed to a polymer recovery system for further processing, such as addition of additives and/or extrusion, for example.

Embodiments of the invention generally include heterophasic polymers and process of forming ISBM articles from the same. As described above, heterophasic polymers generally include two or more phases. For example, the first phase may include a homopolymer, such as polypropylene. Unless otherwise specified, the term "homopolymer" includes those polymers composed primarily of a polymer, such as polypropylene, and limited amounts of other comonomers, such as ethylene, wherein the comonomer makes up less than about 0.5 wt. %, or less than about 0.3 wt. % or less than about 0.1 wt. % by weight of polymer, for example.

The second phase generally includes a rubber phase, such as ethylene-propylene rubber (EPR), which is incorporated into the polymer matrix by suitable methods. For example, the rubber phase may be incorporated into the polymer matrix by mechanical blending or co-polymerization, for example. The co-polymerization process may include at least two stages, wherein a first polymer, generally a homopolymer (e.g., polypropylene) is produced in a first reaction zone, the product of which is transferred to a second reaction zone for contact with a comonomer and additional monomer (e.g., propylene) to produce a rubber component of the heterophasic copolymer.

Polymer Product

The polymers (and blends thereof) formed via the processes described herein may include, but are not limited to, linear low density polyethylene, elastomers, plastomers, high density polyethylenes, low density polyethylenes, medium density polyethylenes, polypropylene and polypropylene copolymers, for example.

Unless otherwise designated herein, all testing methods are the current methods at the time of filing.

In one or more embodiments, the polymers include propylene based polymers. As used herein, the term "propylene based" is used interchangeably with the terms "propylene polymer" or "polypropylene" and refers to a polymer having at least about 50 wt. %, or at least about 70 wt. %, or at least about 75 wt. %, or at least about 80 wt. %, or at least about 85 wt. % or at least about 90 wt. % polypropylene relative to the total weight of polymer, for example.

The propylene based polymers may have a molecular weight distribution ($M_n/M_w$) of from about 1.5 to about 20, or from about 2 to about 12, for example.

The propylene based polymers may have a melting point ($T_m$) (as measured by DSC) of at least about 110° C., or from about 115° C. to about 175° C., for example.

In one or more embodiments, the polymers include propylene based impact copolymers. Unless otherwise specified, the term "propylene based impact copolymer" refers to those copolymers composed primarily of propylene and an amount of other comonomers, wherein the comonomers are present in an amount of from about 1.0 wt. % to about 15 wt. %, or from about 3.0 wt. % to about 11 wt. % or from about 5.0 wt. % to about 10 wt. % relative to the total weight of polymer, for example. The comonomers may be selected from $C_2$ to $C_{10}$ alkenes. For example, the comonomers may be selected from ethylene, propylene, 1-butene, 1-pentene, 1-hexene, 1-heptene, 1-octene, 1-nonene, 1-decene, 4-methyl-1-pentene and combinations thereof. In one specific embodiment, the comonomer includes ethylene. In one or more embodiments, the comonomer is ethylene.

In one or more embodiments, the propylene based impact copolymers have a melt flow rate of at least about 1 dg./min., or from about 1.5 dg./min. to about 150 dg./min. or from about 2 dg./min. to about 30 dg./min., for example.

Product Application

The polymers and blends thereof are useful in applications known to one skilled in the art, such as forming operations (e.g., film, sheet, pipe and fiber extrusion and co-extrusion as well as blow molding, injection molding and rotary molding). Films include blown, oriented or cast films formed by extrusion or co-extrusion or by lamination useful as shrink film, cling film, stretch film, sealing films, oriented films, snack packaging, heavy duty bags, grocery sacks, baked and frozen food packaging, medical packaging, industrial liners, and membranes, for example, in food-contact and non-food contact application. Fibers include slit-films, monofilaments, melt spinning, solution spinning and melt blown fiber operations for use in woven or non-woven form to make sacks, bags, rope, twine, carpet backing, carpet yarns, filters, diaper fabrics, medical garments and geotextiles, for example. Extruded articles include medical tubing, wire and cable coatings, sheet, thermoformed sheet, geomembranes and pond liners, for example. Molded articles include single and multilayered constructions in the form of bottles, tanks, large hollow articles, rigid food containers and toys, for example.

In one or more embodiments, the polymers are utilized in injection stretch blow molding (ISBM) processes to form ISBM articles. The ISBM articles may include thin-walled bottles and other types of containers, for example. The ISBM articles may be formed by any suitable process. For example, ISBM processes may include injecting the polymer into a preform and subsequently stretch-blowing the preform into the desired final form, for example.

In one or more embodiments, the propylene based impact copolymers, as described above, are utilized to form the ISBM articles.

In one or more embodiments, the ISBM articles are refrigerated articles. In one or more embodiments, the refrigerated articles include refrigerated beverage containers. Dairy products and juices are typical of refrigerated beverages which can be stored, transported and sold in the refrigerated articles, for example.

Refrigerated articles formed from the propylene based impact copolymers exhibit improved cold temperature impact strength, an important property for refrigerated articles. In contrast to refrigerated articles formed from random copolymers, which may have a maximum cold temperature drop impact strength of less than about 4 feet, refrigerated articles formed from propylene based impact copolymers exhibit cold temperature drop impact strength (including both horizontal and vertical configurations) of at least about 4 feet, or at least about 5 feet or at least about 6 feet, for example.

In one or more embodiments, the ISBM articles are opaque or semi-opaque. For example, the ISBM articles may exhibit a haze of at least about 10%, or at least about 20% or at least about 30% (as measured by a haze meter).

Many products contained within ISBM articles are light sensitive (e.g., visible or ultraviolet light can be absorbed by the product, potentially resulting in product degradation). Light sensitivity is particularly important for refrigerated products, which can lose nutritional value and gain undesirable flavors upon exposure to light. However, the ISBM opacity (or semi-opacity) of the ISBM articles described herein minimizes product degradation as a result of exposure to light.

In one or more embodiments, the ISBM (e.g., 23 g) articles may exhibit a maximum top load strength of at least about 140 N, or at least about 150 N or at least about 160 N, for example.

In one or more embodiments, the ISBM (e.g., 23 g) articles may exhibit a maximum bumper compression of at least about 70 N, or at least about 75 N or at least about 80 N, for example.

Examples

Polymer "A" refers to TOTAL Petrochemicals 4280 W, which is a low MFR (1.3 dg/min.) nucleated polypropylene-based impact copolymer commercially available from TOTAL Petrochemicals USA, Inc.

Polymer "B" refers to TOTAL Petrochemicals 7525 MZ, which is a propylene based random copolymer having a MFR of 10 dg/min., and which is commercially available from TOTAL Petrochemicals USA, Inc.

The polymer samples were injection stretch blow molded (ISBM) into bottles. The preforms were conditioned at room temperature for at least 24 hours before they were stretch blow molded into bottles on an ADS G62 linear injection stretch blow molder.

The bottles were then tested for top load, bumper compression and drop impact strength.

As illustrated in FIG. 1, ISBM bottles formed from Polymer A exhibited good top load strength, with a maximum load greater than about 140 N at a production rate of 2000 articles/hour and greater than about 160 N at a production rate of 3000 articles/hour. These values are similar to those for bottles formed from Polymer B.

Figure 2:
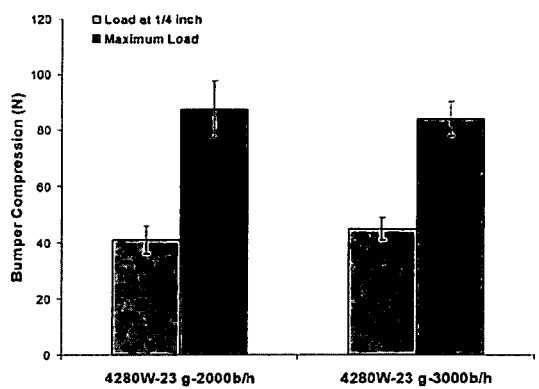
FIG. 2 illustrates the bumper compression of ISBM bottles formed from an impact copolymer.

As illustrated in FIG. 2, ISBM bottles formed from Polymer A exhibited good bumper compression strength, with a maximum load greater than about 80 N at each production rate (2000 articles/hour and 3000 articles/hour). These values are also similar to those for bottles formed from Polymer B. The top load strength and bumper compression strength results indicate that impact copolymers should perform at least as well as the random copolymers in terms of bottle mechanical properties.

The ISBM bottles formed from Polymer A exhibited significantly better cold temperature (4° C.) drop impact strength than those formed from Polymer B. The ISBM bottles formed from Polymer A all maintained their structural integrity when dropped from heights up to 6 feet, both in vertical and horizontal drop configurations. As 6 feet represented the limit of the drop impact testing equipment, even higher drop impact strength ratings are anticipated. In contrast, the bottles formed from Polymer B barely pass the standard 4 feet at 4° C. drop impact strength test.

The bottles formed from Polymer A exhibited a high degree of haze, or semi-opacity. While this may represent a disadvantage in applications where high clarity, or transparency, is desired, many products store better if protected from light.

While the foregoing is directed to embodiments of the present invention, other and further embodiments of the invention may be devised without departing from the basic scope thereof and the scope thereof is determined by the claims that follow.

What is claimed is:

1. An injection stretch blow molded (ISBM) article comprising:
    a propylene-based impact copolymer, wherein the ISBM article has a haze of at least 30% as measured by a haze meter.

2. The ISBM article of claim 1, wherein the propylene-based impact copolymer exhibits a melt flow rate of from about 1 dg/min. to about 150 dg/min.

3. The ISBM article of claim 1, wherein the article exhibits a maximum top load of at least about 160 N at a weight of 23 g.

4. The ISBM article of claim 1, wherein the article exhibits a maximum bumper compression of at least about 80 N at a weight of 23 g.

5. The ISBM article of claim 1, wherein the article exhibits a cold temperature drop impact resistance of at least about 6 feet.

6. The ISBM article of claim 1, wherein the propylene-based impact copolymer comprises ethylene.

7. The ISBM article of claim 6, wherein the propylene-based impact copolymer comprises up to about 15 wt. % of one or more comonomers.

8. The ISBM article of claim 1, wherein the article is a beverage container.

9. The ISBM article of claim 8, wherein the article is a dairy container.

10. An injection stretch blow molded (ISBM) beverage container comprising:
    a propylene-based impact copolymer exhibiting a melt flow rate of from about 1 dg/min to about 150 dg/min.;
    a maximum top load of at least about 160 N at a weight of 23 g;
    a cold temperature drop impact resistance of at least about 6 feet; and
    a haze of at least 30% as measured by a haze meter.

11. A method of forming an injection stretch blow molded (ISBM) article comprising:
    providing a propylene-based impact copolymer;
    injection molding the propylene-based impact copolymer into a preform; and
    stretch-blowing the preform into an article
    wherein the ISBM article has a haze of at least 30% as measured by a haze meter.

12. The method of claim 11, wherein the propylene-based impact copolymer exhibits a melt flow rate of from about 1 dg/min. to about 150 dg/min.

13. The method of claim 11, wherein the article is a dairy container.

14. The method of claim 11, wherein propylene-based impact copolymer has a melting point as measured by DSC of from about 115° C. to about 175° C.

15. The method of claim 11, wherein propylene-based impact copolymer has molecular weight distribution (Mw/Mn) of from about 2 to about 12.

16. The ISBM of claim 1, wherein propylene-based impact copolymer has a melting point as measured by DSC of from about 115° C. to about 175° C.

17. The ISBM of claim 1, wherein propylene-based impact copolymer has molecular weight distribution (Mw/Mn) of from about 2 to about 12.

18. The method of claim 11, wherein the article is stretch-blown at a production rate of at least about 1000 articles per hour.

19. The method of claim 18, wherein the article is stretch-blown at a production rate of at least about 3000 articles per hour.

20. The method of claim 11, wherein the propylene-based impact copolymer comprises ethylene.

21. The method of claim 20, wherein the propylene-based impact copolymer comprises up to about 15 wt. % ethylene.

* * * * *